(12) United States Patent
Jacobsen et al.

(10) Patent No.: US 8,714,928 B2
(45) Date of Patent: May 6, 2014

(54) ROTOR ASSEMBLY FOR A WIND TURBINE AND METHOD OF ASSEMBLING THE SAME

(75) Inventors: Eric Morgan Jacobsen, Greenville, SC (US); Florian Doorenspleet, Rheine (DE)

(73) Assignee: General Electric Company, Schenectady, NY (US)

( * ) Notice: Subject to any disclaimer, the term of this patent is extended or adjusted under 35 U.S.C. 154(b) by 921 days.

(21) Appl. No.: 12/134,384

(22) Filed: Jun. 6, 2008

(65) Prior Publication Data

US 2009/0304513 A1    Dec. 10, 2009

(51) Int. Cl.
    *B63H 1/20*    (2006.01)

(52) U.S. Cl.
    USPC ............... 416/204 R; 416/223 R; 29/889

(58) Field of Classification Search
    USPC .......... 416/223 R, 226, 224, 225, 228, 227 A,
              416/227 R, 234, 237, 204 R; 29/889, 889.6,
                                          29/889.7; 290/55
    See application file for complete search history.

(56) References Cited

U.S. PATENT DOCUMENTS

| | | |
|---|---|---|
| 4,366,387 A | 12/1982 | Carter, Jr. et al. |
| 4,431,375 A | 2/1984 | Carter, Jr. et al. |
| 4,533,297 A * | 8/1985 | Bassett .................. 416/132 B |
| 5,167,489 A | 12/1992 | Wadia et al. |
| 6,582,196 B1 | 6/2003 | Andersen et al. |
| 2002/0153729 A1* | 10/2002 | Beauchamp et al. ........... 290/55 |
| 2007/0025856 A1* | 2/2007 | Moroz ...................... 416/223 R |
| 2007/0205602 A1* | 9/2007 | Willey et al. ................... 290/44 |
| 2008/0112813 A1 | 5/2008 | Rochholz |

FOREIGN PATENT DOCUMENTS

| | | |
|---|---|---|
| CN | 1269869 A | 10/2000 |
| DE | 202006013519 U1 | 1/2007 |

OTHER PUBLICATIONS

First Office Action of Chinese Patent Application No. 200910146057.1 with English Language Translation; Nov. 2, 2012; 10 pages.

Office action issued in connection with CN Patent Application No. 200910146057.1, Jun. 26, 2013.

* cited by examiner

*Primary Examiner* — Julio J Maldonado
*Assistant Examiner* — Robert Bachner
(74) *Attorney, Agent, or Firm* — James McGinness; Armstrong Teasdale LLP

(57) ABSTRACT

A rotor assembly is provided that includes a hub rotatable about an axis of rotation. The assembly also includes a plurality of rotor blades spaced circumferentially about the hub. Each of said rotor blades extends from a blade root to a blade tip such that said plurality of blades are rotatable through a plane of rotation extending about said axis of rotation, said plane of rotation is defined as substantially perpendicular to said axis of rotation, wherein each of said blade roots is coupled to said hub, wherein each of said blade tips is offset a distance upstream from said plane of rotation.

21 Claims, 5 Drawing Sheets

ROTOR ASSEMBLY FOR A WIND TURBINE AND METHOD OF ASSEMBLING THE SAME

BACKGROUND OF THE INVENTION

The field of the present disclosure relates generally to wind turbines, and more specifically to wind turbines that include coned hub assemblies.

At least some known wind turbine towers include a nacelle that is coupled atop a tower, wherein the nacelle includes a rotor assembly coupled via a shaft to a generator. In known rotor assemblies, a plurality of blades extends from the rotor, and the assembly is oriented such that wind contacts the rotor and blades, and thereafter the tower. This configuration is generally known as a "front-runner" assembly. Additionally, the blades are oriented such that wind passing over the blades turns the rotor and rotates the shaft, thereby driving the generator to generate electricity.

In at least some known rotor assemblies, wind pressure exerted against the blades may cause an elastic rearward flexing of the blades, and as a result the blade tips may be pushed in close proximity to the tower, especially during strong wind conditions. Some know wind turbine towers are configured to brake the rotor in strong winds. However, in such towers, increased braking of the rotor may result in increased pressure being induced against the blades, which may cause rearward flexing of the blades towards the tower to increase. Because known wind turbines must function effectively during strong wind conditions, it is necessary for the bladed rotor to be positioned a sufficient distance from the tower so that during operation, the potential of blade contact with the tower, and associated risk of serious accidents and/or equipment damage, may be substantially reduced.

To facilitate reducing rearward flexing of the rotor blades during operation some known wind turbines use blades fabricated from materials that have an increased stiffness. Such materials enable the blades to withstand a higher wind pressure, without requiring that the blade hub be positioned an exaggerated distance from the vertical axis of the tower. However, such materials also increase blade production costs, and create greater loading upon turbine components as a result of the increased weight of the blades. As a result, often such turbines and require a more robust and less efficient turbine design.

Other known wind turbines use a tilted rotor, wherein the axis of rotation of the rotor is shifted upwards with respect to the angle of the oncoming wind. As such, the tips of the blades are shifted a distance away from the turbine tower as the blades pass through the lower most point of their rotational path. However, such a design causes uneven contact between the oncoming wind and the blades, which may induce a yaw-error to the wind turbine and thus effectively reduce system efficiency.

BRIEF DESCRIPTION OF THE INVENTION

In one aspect, a wind turbine system is provided. The system includes a stator configured to generate electricity, and a rotor rotatably coupled to the stator. The rotor includes a hub rotatable about an axis of rotation, and a plurality of rotor blades spaced circumferentially about the hub, each of said rotor blades extends from a blade root to a blade tip such that said plurality of blades are rotatable through a plane of rotation extending about said axis of rotation, said plane of rotation is defined as substantially perpendicular to said axis of rotation, wherein each of said blade roots is coupled to said hub, wherein each of said blade tips is offset a distance upstream from said plane of rotation.

In another aspect, a rotor assembly is provided. The assembly includes a hub rotatable about an axis of rotation. The assembly also includes a plurality of rotor blades spaced circumferentially about the hub. Each of said rotor blades extends from a blade root to a blade tip such that said plurality of blades are rotatable through a plane of rotation extending about said axis of rotation, said plane of rotation is defined as substantially perpendicular to said axis of rotation, wherein each of said blade roots is coupled to said hub, wherein each of said blade tips is offset a distance upstream from said plane of rotation.

In yet another aspect, a method of assembling a wind turbine system is provided. The method includes providing a hub rotatable about an axis of rotation, and coupling a plurality of rotor blades circumferentially about the hub, wherein each of said rotor blades extends from a blade root to a blade tip such that said plurality of blades are rotatable through a plane of rotation extending about said axis of rotation, said plane of rotation is defined as substantially perpendicular to said axis of rotation, wherein each of said blade roots is coupled to said hub, wherein each of said blade tips is offset a distance upstream from said plane of rotation.

BRIEF DESCRIPTION OF THE DRAWINGS

Corresponding reference characters indicate corresponding parts throughout the drawings.

DETAILED DESCRIPTION OF THE INVENTION

Figure 1:
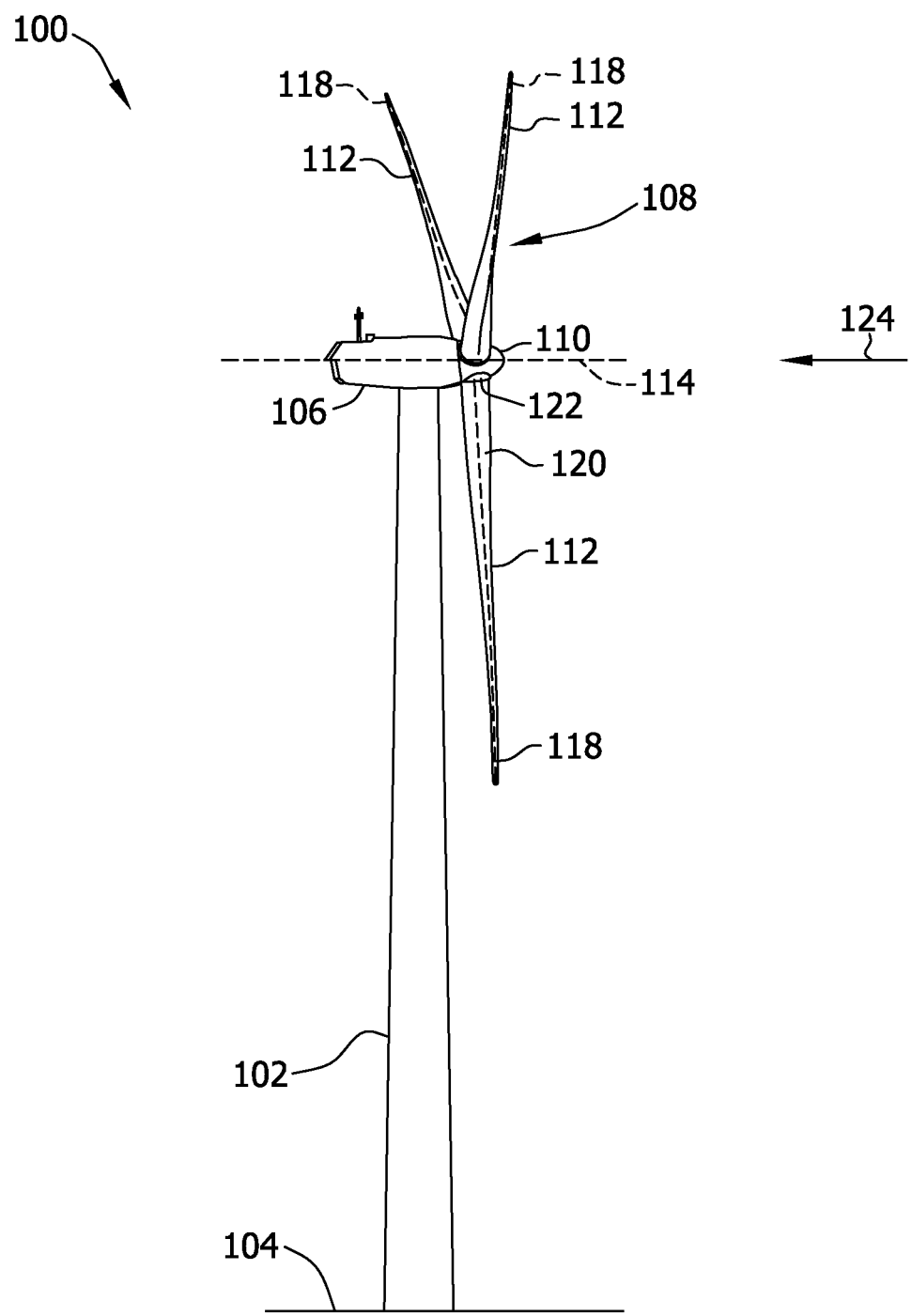
FIG. 1 is a side elevation view of an exemplary wind turbine.

FIG. 1 is a side elevation view of an exemplary wind turbine 100. In the exemplary embodiment, wind turbine 100 is a nearly horizontal-axis wind turbine. In another embodiment, wind turbine 100 may have an up-tilt angle (not shown) ranging from about 1° to about 15°. Alternatively, wind turbine 100 is a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. In an alternative embodiment, rotor 108 includes more or less than three rotor blades 112. In the exemplary embodiment, tower 102 is fabricated from tubular steel and has a cavity (not shown in FIG. 1) defined between supporting surface 104 and nacelle 106. In an alternate embodiment, tower 102 is a lattice tower. A height of tower 102 is selected based upon factors and conditions known in the art.

Blades 112 are positioned about rotor hub 110 to facilitate rotating rotor 108 to transfer kinetic energy from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced to blades 112 are transferred to hub 110 via load transfer regions 122.

In the exemplary embodiment, blades 112 have a length ranging from about 50 feet (ft) (about 15 meters (m)) to about 300 ft (about 91 m). Alternatively, blades 112 may have any length that enables wind turbine 100 to function as described herein. For example, other non-limiting examples of blade lengths include 10 meters or less, 20 meters, and 37 meters. As wind strikes blades 112 from a direction 124, rotor 108 is rotated about an axis of rotation 114. As blades 112 are rotated and subjected to centrifugal forces, blades 112 are also subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines a perspective of blades 112 with respect to the direction of the wind, may be changed by a pitch adjustment mechanism (not shown in FIG. 1) that facilitates increasing or decreasing blade 112 speed by adjusting the surface area of blades 112 exposed to the wind force vectors. Pitch axes 118 for blades 112 are illustrated. In the exemplary embodiment, each blade's pitch is controlled individually. Alternatively, blade pitch for all blades may be controlled simultaneously.

Figure 2:
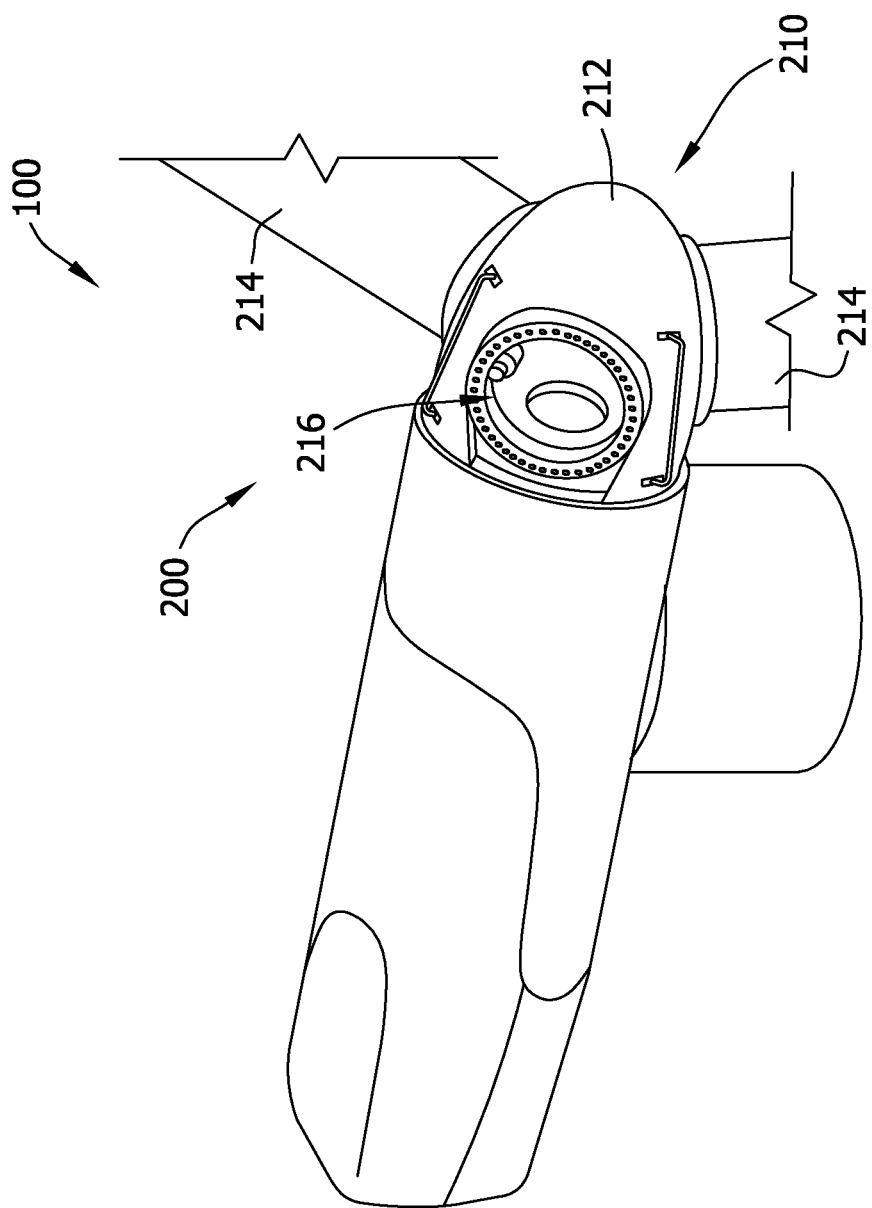
FIG. 2 is a schematic illustration of an exemplary coned-hub assembly used with the wind turbine shown in FIG. 1.
Figure 3:
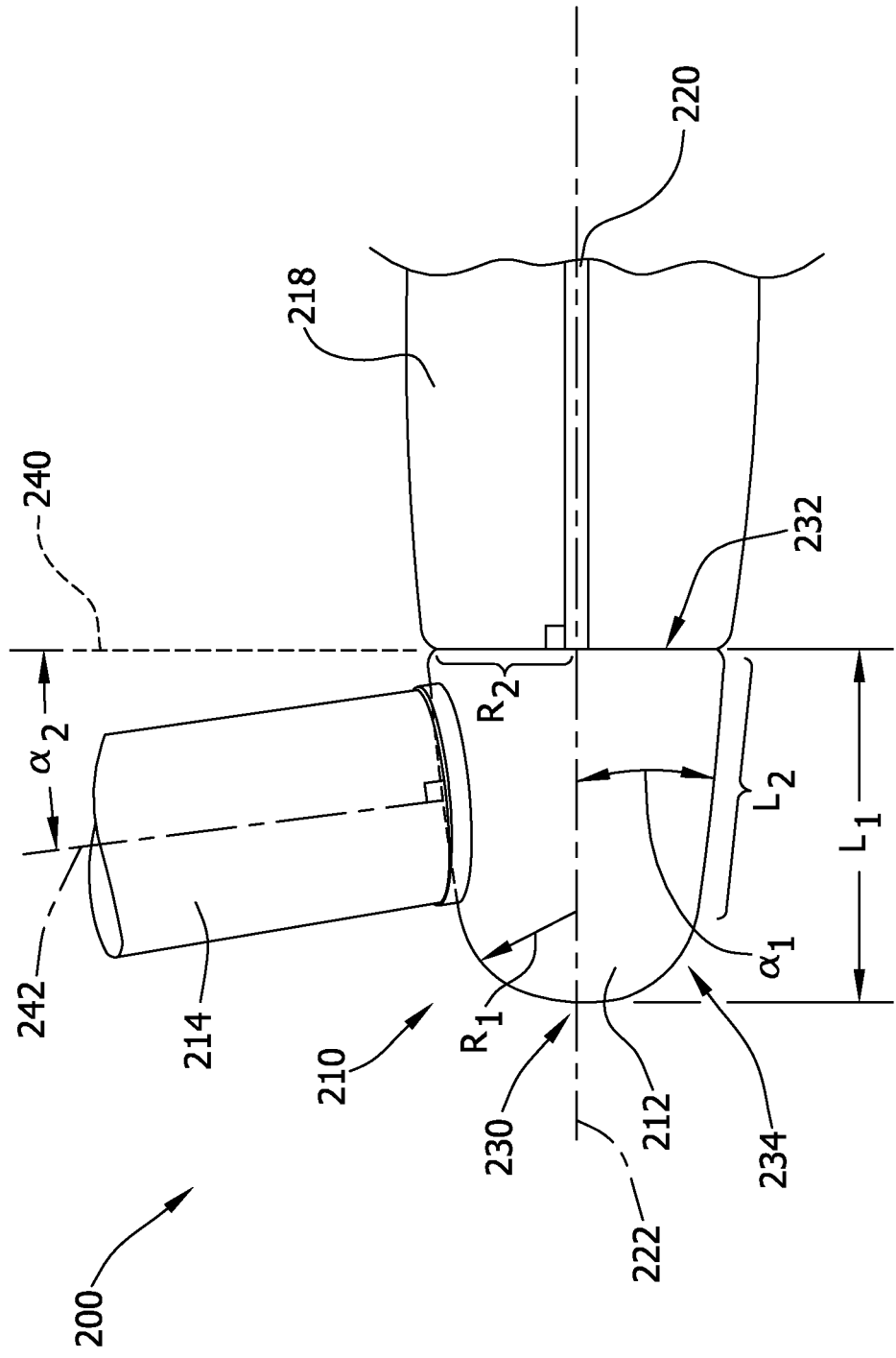
FIG. 3 is a side perspective view of the coned hub shown in FIG. 2.

Referring to FIGS. 2 and 3, FIG. 2 is a schematic illustration of an exemplary coned hub system 200 used with wind turbine 100, and FIG. 3 is a perspective view of coned hub system 200. In the exemplary embodiment, coned hub system 200 includes a hub assembly 210, hub external surface 212, and a plurality of rotor blades 214. Rotor blades 214 are coupled to hub assembly 210 via a pitch bearing assembly 216 that enables a pitch of each rotor blade 214 to be changed depending upon external conditions. More specifically, in the exemplary embodiment, the pitch of each blade 214 can be independently controlled via each blade's respective pitch bearing assembly 216. Alternatively, a pitch of all rotor blades 214 may be controlled simultaneously.

Coned hub system 200 is coupled to nacelle structure 218 via a central shaft 220 that defines an axis of rotation 222. In the exemplary embodiment, hub system 200 includes a hub assembly 210, hub external surface 212, and plurality of blades (not shown). For clarity, only a single blade 214 is illustrated in FIG. 3. Hub assembly 210 is fabricated such that hub external surface 212 is substantially cone-shaped. More specifically and in the exemplary embodiment, hub assembly 210 includes a first end 230 and an opposite second end 232 that are separated by a length $L_1$ extending along axis of rotation 222. Hub first end 230 includes a blunt, approximately spherically-shaped portion 234 that defines a radius of curvature of $R_1$. In the exemplary embodiment, hub second end 232 has a radius $R_2$ that is longer than $R_1$. Hub radius $R_1$ increases linearly to hub radius $R_2$ along a length $L_2$ of hub external surface 212. Alternatively, $R_2$ may define a hub external surface with a non-circular cross-sectional area. In the exemplary embodiment, an angle $\alpha_1$ is defined between hub external surface 212 and axis of rotation 222. In the exemplary embodiment, angle $\alpha_1$ ranges from about 0.2 degrees to about 20 degrees. Alternatively, angle $\alpha_1$ may be any angle that enables wind turbine 100 to function as described herein.

For illustrative purposes, a plane 240 that is substantially perpendicular to axis of rotation 222 is illustrated in FIG. 3. In the exemplary embodiment, rotor blade 214 is coupled to hub assembly 210 as described herein. Rotor blade 214 is coupled substantially perpendicularly to hub external surface 212 such that an angle $\alpha_2$ is defined between a rotor blade midchord 242 and plane 240. As such, $\alpha_2$ is substantially equivalent to $\alpha_1$. In the exemplary embodiment, rotor blade 214 is coupled to hub assembly 210 such that angle $\alpha_2$ is approximately equal to angle $\alpha_1$. Alternatively, rotor blade 214 may be coupled to hub assembly 210 such that angle $\alpha_2$ is greater than angle $\alpha_1$, and such that each angle $\alpha_1$ and angle $\alpha_2$ is a magnitude that enables the wind turbine 100 to function as described herein, and which prevents rotor blade 214 from striking tower 102 (shown in FIG. 1).

Figure 4:
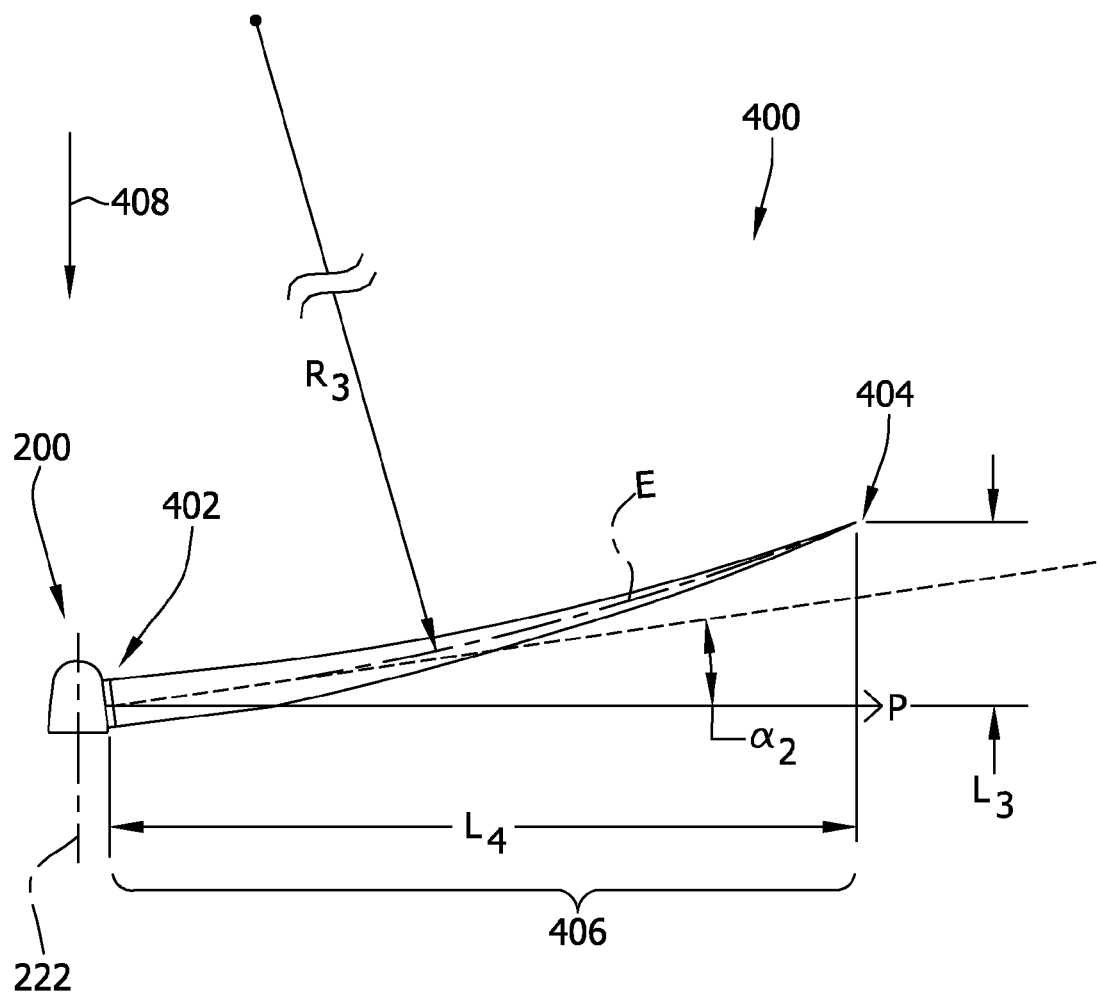
FIG. 4 is a schematic illustration of an exemplary rotor blade used with the wind turbine shown in FIG. 1.

FIG. 4 illustrates an exemplary rotor blade 400 coupled to hub system 200. Configurations of exemplary rotor blade are applicable to rotor blades of any length $L_4$. For example, and not by way of limitation, in some embodiments, blades 400 have a length $L_4$ of approximately 0.5 meters. In other configurations, blades 400 have a length $L_4$ of approximately 50 meters. Other non-limiting examples of blade lengths $L_4$ include 10 meters or less, 20 meters, 37 meters, and 50 meters. In the exemplary embodiment, rotor blade 400 includes a root 402 and tip 404, a spanwise axis E and a pitch axis P. More specifically, in the exemplary embodiment, rotor blade 400 has a curved span 406, wherein the magnitude of the curve is defined by a radius of curvature $R_3$. In the exemplary embodiment, radius of curvature $R_3$ is substantially constant along spanwise axis E from root 402 to tip 404. In the exemplary embodiment, tip 404 is offset a distance $L_3$ defined by the radius of curvature $R_3$ into a direction of oncoming wind 408 and away from the support tower (not shown). In the exemplary embodiment, distance $L_3$ ranges from about 0.2 meters to about 5 meters. Alternatively, tip 404 may be offset a distance that enables wind turbine 100 to function as described herein. Such a system provides a wind turbine that operates to prevent rotor blade 214 from striking tower 102 (shown in FIG. 1) and reduce loads upon turbine components.

Figure 5:
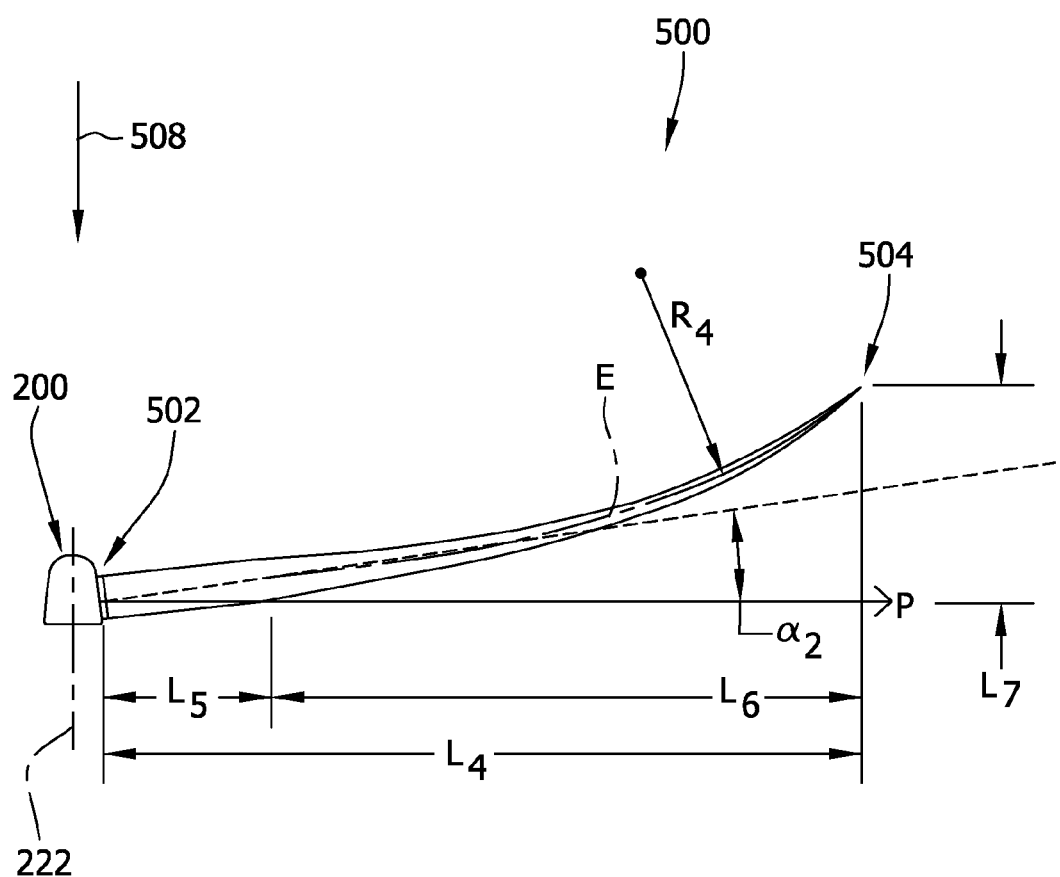
FIG. 5 is a schematic illustration of an alternative rotor blade that may be used with the wind turbine shown in FIG. 1.

FIG. 5 illustrates an alternative rotor blade configuration that may be coupled coned hub system 200. In the exemplary embodiment, rotor blade 500 includes a root 502 and tip 504, a spanwise axis E, a pitch axis P and a span length $L_4$. More specifically, in the exemplary embodiment, rotor blade 500 includes a partial span $L_5$ this is substantially planar and a partial span $L_6$ that is arcuate. Measured from root 502, partial span $L_5$ ranges from about ⅓ of span length $L_4$ to about ½ of span length $L_4$ measured from root 502. Partial span $L_6$ is then defined as the difference between span length $L_4$ and partial span $L_5$, and in the exemplary embodiment, has a radius of curvature $R_4$ that is substantially constant along spanwise axis E. Tip 504 is offset a distance $L_7$, defined by the radius of curvature $R_4$, into a direction of oncoming wind 508 and away from the support tower (not shown). Similar to the embodiment illustrated in FIG. 4, tip offset $L_7$ ranges from about 0.2 meters to about 5 meters. Alternatively, tip may be offset in an upstream direction any distance that allows wind turbine to function as described herein. Such a system provides a wind turbine that operates to prevent rotor blade 214 from striking tower 102 (shown in FIG. 1) and reduce loads upon turbine components.

Exemplary embodiments of a wind turbine using a combination of a pitched hub and contoured, forward-pitched rotor blades are described in detail above. The exemplary blades described herein may be used to facilitate substantially reducing the occurrence of tower strikes by the blades, even under strong wind conditions. In general, the above-described system used arcuate blades or partially arcuate blades that are coupled to a coned hub such that the blade is at least partially angled into the oncoming wind. Because each of the blades coupled to the turbine are substantially identical, the need for heavier, stiffer blades typically used to prevent tower strikes is facilitated to be eliminated. Additionally, the system and methods described herein provide a wind turbine that operates with a higher efficiency than known wind turbines that use rotor blades fabricated from heavier and/or stiffer materials. Such a system also provides a wind turbine that operates to prevent the rotor blades from striking the wind turbine tower as well as to reduce loads upon turbine components.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A wind turbine system comprising:
   a stator configured to generate electricity; and
   a rotor rotatably coupled to the stator, said rotor comprising;
   a hub rotatable about an axis of rotation and comprising an external surface that is offset at a first angle with respect to the axis of rotation; and
   a plurality of rotor blades spaced circumferentially about said hub, each of said rotor blades having a spanwise axis extending from a blade root located at a hub side of the blade to a blade tip located at an end opposite the blade root such that said plurality of rotor blades are rotatable through a plane of rotation extending about said axis of rotation, said plane of rotation is defined as substantially perpendicular to said axis of rotation, wherein each of said blade roots is coupled substantially perpendicular to said hub at a second angle upstream with respect to the plane of rotation such that an entirety of the spanwise axis of at least one of said rotor blades is even with, or offset a distance upstream from, said plane of rotation and at least one of said blade tips is offset a distance upstream from said plane of rotation, wherein said hub comprises a first end having a first radius of curvature with respect to the axis of rotation and comprising a second end having a second radius of curvature with respect to the axis of rotation, and
   the second radius of curvature is larger than the first radius of curvature.

2. A wind turbine system in accordance with claim 1, wherein each of said rotor blades comprises a one-piece and uninterrupted, curved span comprising a uniform radius of curvature.

3. A wind turbine system in accordance with claim 2, wherein each of the said rotor blades comprises a substantially straight blade section extending along the length of each rotor blade from a blade first end to a second location along the blade length that is radially outward from said blade first end.

4. A wind turbine system in accordance with claim 3, wherein said straight blade section extends along the length of said rotor blade from said blade first end to a location from about ⅓ of the blade length to about ½ of the blade length.

5. A wind turbine system in accordance with claim 1, wherein said plurality of rotor blades is offset a distance from a perpendicular axis measured from a wind turbine hub.

6. A wind turbine system in accordance with claim 1, wherein said offset distance ranges from about 0.2 meters to about 5 meters.

7. A wind turbine system in accordance with claim 1, wherein the second angle measured from at least one blade tip to said plane of rotation ranges from about 0.2 degrees to about 20 degrees.

8. A rotor assembly comprising:
   a hub rotatable about an axis of rotation; and
   a plurality of rotor blades spaced circumferentially about said hub, each of said rotor blades having a spanwise axis extending from a blade root located at a hub side of the blade to a blade tip located at an end of said blade opposite the blade root such that said plurality of rotor blades are rotatable through a plane of rotation extending about said axis of rotation, said plane of rotation is defined as substantially perpendicular to said axis of rotation, wherein each of said blade roots is coupled to said hub at an angle with respect to the plane of rotation such that an entirety of the spanwise axis of each of said rotor blades is continuous and uninterrupted and even with, or offset a distance upstream from, said plane of rotation and at least one of said blade tips is offset a distance upstream from said plane of rotation, wherein said hub comprises a first end having a first radius of curvature with respect to the axis of rotation and comprising a second end having a second radius of curvature with respect to the axis of rotation, and
   the second radius of curvature is larger than the first radius of curvature.

9. A rotor assembly in accordance with claim 8, wherein each of said rotor blades comprises a curved span comprising at least one of a uniform radius of curvature and a non-uniform radius of curvature.

10. A rotor assembly in accordance with claim 9, wherein each of said plurality of rotor blades comprises a substantially straight blade section extending along the length of said rotor blade from a blade first end to a second location along the blade length that is radially outward from said blade first end.

11. A rotor assembly in accordance with claim 10, wherein said straight blade section extends along the length of said rotor blade from the blade first end to a location from about ⅓ of the blade length to about ½ of the blade length.

12. A rotor assembly in accordance with claim 8, wherein each of said rotor blades is offset a distance from a perpendicular axis measured from a wind turbine hub.

13. A rotor assembly in accordance with claim 8, wherein said offset distance ranges from about 0.2 meters to about 5 meters.

14. A rotor assembly in accordance with claim 8, wherein offset angles measured from said blade tips to said plane of rotation range from about 0.2 degrees to about 20 degrees.

15. A method of assembling a wind turbine system comprising:
   providing a hub rotatable about an axis of rotation, the hub comprising an external surface that is offset at a first angle with respect to the axis of rotation; and
   coupling a plurality of rotor blades circumferentially about the hub, wherein each of said rotor blades has a spanwise axis that extends from a blade root located at a hub side of the blade to a blade tip located at an end of said blade opposite the blade root such that said plurality of blades are rotatable through a plane of rotation extending about said axis of rotation, said plane of rotation is defined as substantially perpendicular to said axis of rotation, wherein each of said blade roots is coupled substantially perpendicular to said external surface at a second angle upstream with respect to the plane of rotation such that an entirety of the spanwise axis of each of said rotor blades is even with, or offset a distance upstream from, said plane of rotation and at least one of said blade tips is offset a distance upstream from said plane of rotation, wherein said hub comprises a first end having a first radius of curvature with respect to the axis of rotation and comprising a second end having a second radius of curvature with respect to the axis of rotation, and the second radius of curvature is larger than the first radius of curvature.

16. A method in accordance with claim 15, comprising fabricating the plurality of rotor blades with at least one of a uniform radius of curvature and a non-uniform radius of curvature.

17. A method in accordance with claim 16, comprising fabricating the plurality of rotor blades with a substantially straight blade section extending along the length of the blade from a blade first end to a second location along the blade length that is radially outward from the blade first end.

18. A method in accordance with claim 17, comprising fabricating the plurality of blades such that the straight blade section extends along the length of the blade from the blade first end to a location from about ⅓ of the blade length to about ½ of the blade length.

19. A method in accordance with claim 15, wherein the coupling the plurality of rotor blades circumferentially about the hub further comprises offsetting the distance of the blade tips from the plane of rotation by about 0.2 meters to about 5 meters.

20. A method in accordance with claim 15, wherein coupling the plurality of rotor blades circumferentially about the hub further comprises offsetting the blade tips by angles measured from the blade tips to the plane of rotation by about 0.2 degrees to about 20 degrees.

21. The wind turbine system of claim 1, wherein the first angle is approximately equal to the second angle.

* * * * *